Sept. 19, 1933.    R. G. SMITH    1,927,599
TURTLE TRAP
Filed Nov. 5, 1932    2 Sheets-Sheet 2
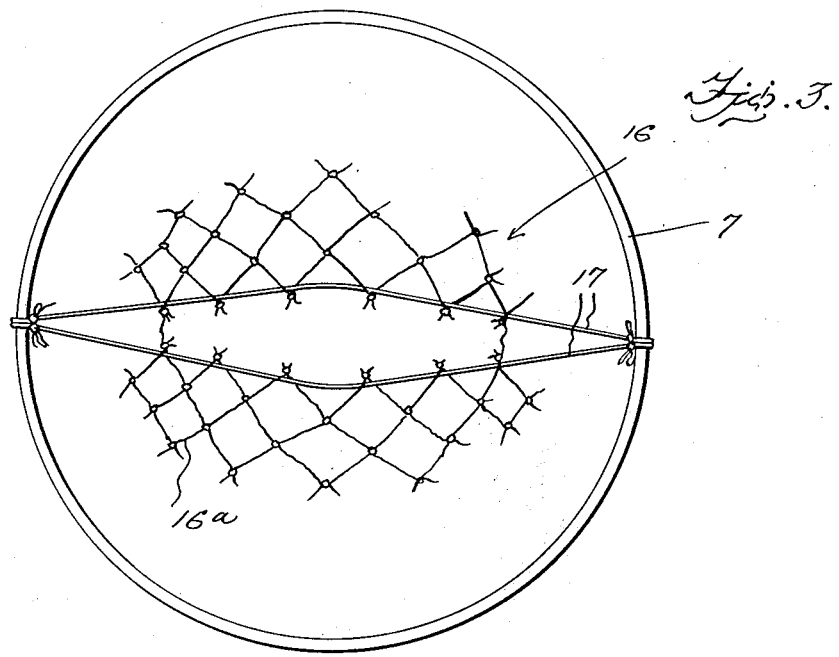
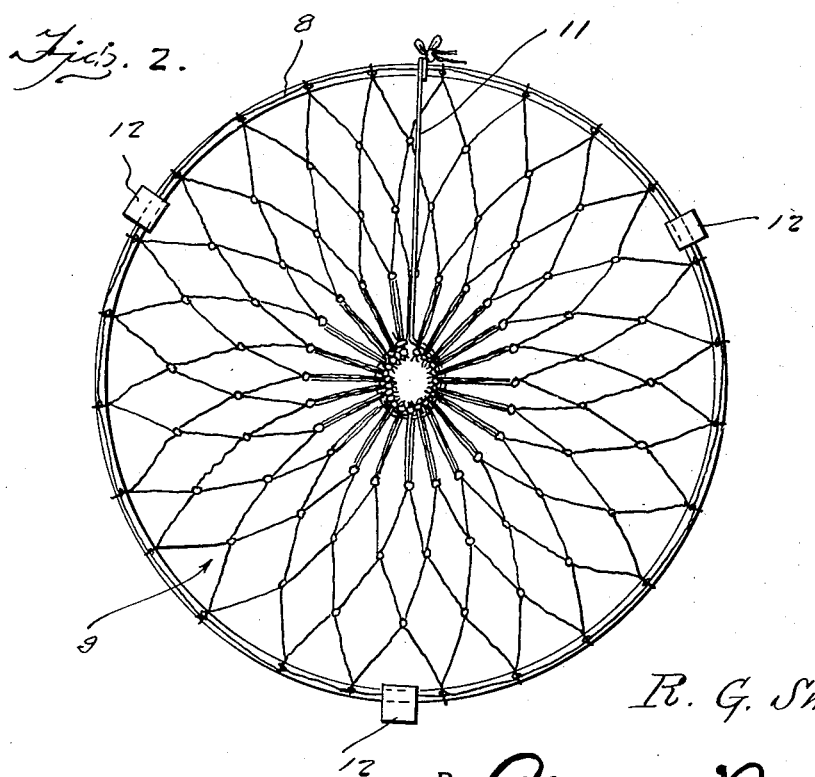
Inventor
R. G. Smith
By Clarence A. O'Brien
Attorney Patented Sept. 19, 1933

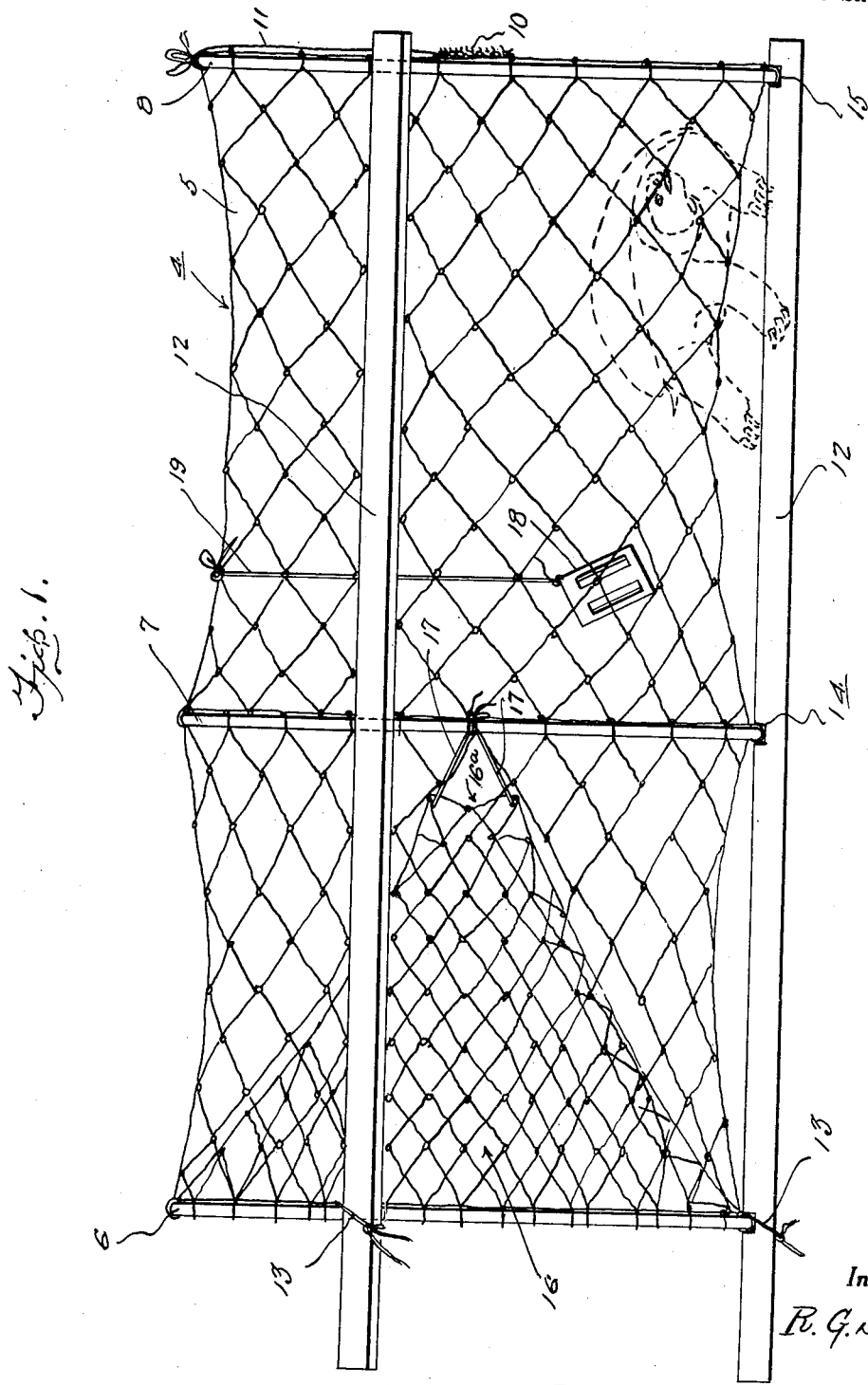

1,927,599

UNITED STATES PATENT OFFICE 1,927,599

TURTLE TRAP

Robert G. Smith, Farmington, Conn.

Application November 5, 1932. Serial No. 641,436

1 Claim. (Cl. 43—103)

This invention relates to an improved trap which is especially designed for catching snapping turtles.

It is agreed by authorities that snapping turtles are undoubtedly a menace to game fish and birds. As a means of safeguarding and preserving these fish and birds and while at the same time considering the value of snapping turtles as a food and delicacy, I have evolved and produced an especially designed and easily handled trap for catching turtles of this particular variety.

Briefly stated, the preferred embodiment of the invention comprises an open-work cage constructed of rope or equivalent material wherein the ropes are tied together to definite openings of a sufficient size to permit fish to pass therethrough without being trapped while at the same time affording the requisite type of enclosure for adequate maintenance of turtles.

In carrying the principles of the present inventive conception into actual practice, I have discovered a style and type of turtletrap which is especially useful for the purpose intended.

Other features and advantages of the invention will become more readily apparent from the following description and drawings.

In the drawings:

Figure 1 is an elevational view of a trap constructed in accordance with this invention, showing the manner in which it is set up for use.

Figure 2 is a rear end view thereof, that is, a view of Figure 1 observing said figure in a direction from right to left.

Figure 3 is a view of the opposite end of the structure seen in Figure 1, observing it in a direction from left to right.

Referring now to the preferred embodiment of the invention as illustrated in the drawings and particularly to Figure 1, it will be observed that the cage proper is generally denoted by the numeral 4. As before stated, it is of openwork design and constructed of a plurality of ropes tied together to form substantially diamond-shaped portions 5, these being disposed with respect to the longitudinal dimension of the complete trap as to distribute the strain and stress and to render the cage substantially self-bracing.

The ropes forming this cage are attached to a group of three distinguishable metal rings 6, 7 and 8 respectively. The right hand end of the cage fastened to the ring 8 is of openwork formation as indicated in Figure 2 by the numeral 9 and at this time I direct attention to the fact that this is the end which is made to permit the turtles to be discharged therefrom after a sufficient number have been caught in the trap.

I also invite attention to the numeral 10 which designates the discharge opening which is really defined by using a drawing string 11 which is laced through the looped portion of the woven rope in the manner disclosed so as to permit the opening to be opened and closed in a familiar manner. The free end of the drawing string is attached to the adjacent ring 8.

Attention is called to the fact that the entire cage is collapsible whereby to permit the three rings 6, 7 and 8 to be brought together in close proximity to form a convenient package for easy handling and transportation purposes. The trap 4 is maintained in an extended state through the medium of the reach bars or stay rods 12, these being arranged in circumferentially spaced order at equidistant points. The left hand ends of the rods are tied as indicated at 13 to the ring 6 while the right hand ends and intermediate portions are formed with keeper notches 14 and 15 engageable with the respective rings 7 and 8. This facilitates erecting and collapsing of the trap.

The numeral 16 designates the woven-work substantially conical inlet or entrance whose inner open end portion defining the elongated openings 16a is tied by separate cords 17 to the ring 7. By flattening the opening 16a and tying the woven rope of the entrance 16 to the ring 7 a peculiar action is had. This particular shape facilitates entrance of turtles and at the same time frustrates any attempt of the turtles to escape from the trap by way of said entrance. As a matter of fact, any pressure exerted by the turtle against the mouth 16a to collapse it in a direction from right to left in Figure 1 causes the strings 17 to become taut and to move together in such a way as to gradually restrict and close this opening 16a.

The numeral 18 in Figure 1 designates a container for the bait which is suitably suspended by a wire or the like 19 to entice the turtles into the trap.

I desire to emphasize that the trap is collapsible and substantially self-bracing. In this connection, I desire to point out that I have experimented considerably with different forms of mesh until I have discovered a mesh of the right shape and angle so that the cords defining the diamond shaped portions 5 are at the proper angle and disposed properly with respect to the longitudinal dimension of the trap 4 as a unit to distribute the strain and stress and to prevent a tendency of the trap to twist and become mean to handle.

Under this arrangement, no extra braces are needed other than the reach sticks or rods 12 detachably connected with the rings 6, 7 and 8.

The inlet opening 16ª of the conical entrance 16 is so designed and anchored through the intermediacy of the strings or cords 17 as to render it substantially self-closing when pressure is exerted against the opening 16 in an effort to escape from the trap.

The whole trap is light in weight, strong and durable, and such in construction that the game warden in distributing the traps can carry quite a number in a boat or an automobile.

I claim:

A trap of the class described comprising a plurality of longitudinally spaced rings, an openwork tubular cage attached to said rings and of a flexible collapsible type, a plurality of longitudinally notched reach rods, the rings being removably arranged in the notches of said rods to hold the cage in a longitudinally distended state, an inwardly extending substantially conical inlet of openwork form carried by one of the end rings and projecting into the interior of the cage and having a restricted substantially flattened discharge mouth at its inner end, and a pair of anchoring cords attached to the flattened end walls of said mouth and the adjacent intermediate ring, whereby to restrict said mouth when pressure is exerted outwardly against the mouth by a turtle attempting to escape whereby to frustrate said escape said pair of anchoring cords being attached at their ends to diametrically opposite points of the ring.

ROBERT G. SMITH.